Patented May 31, 1949

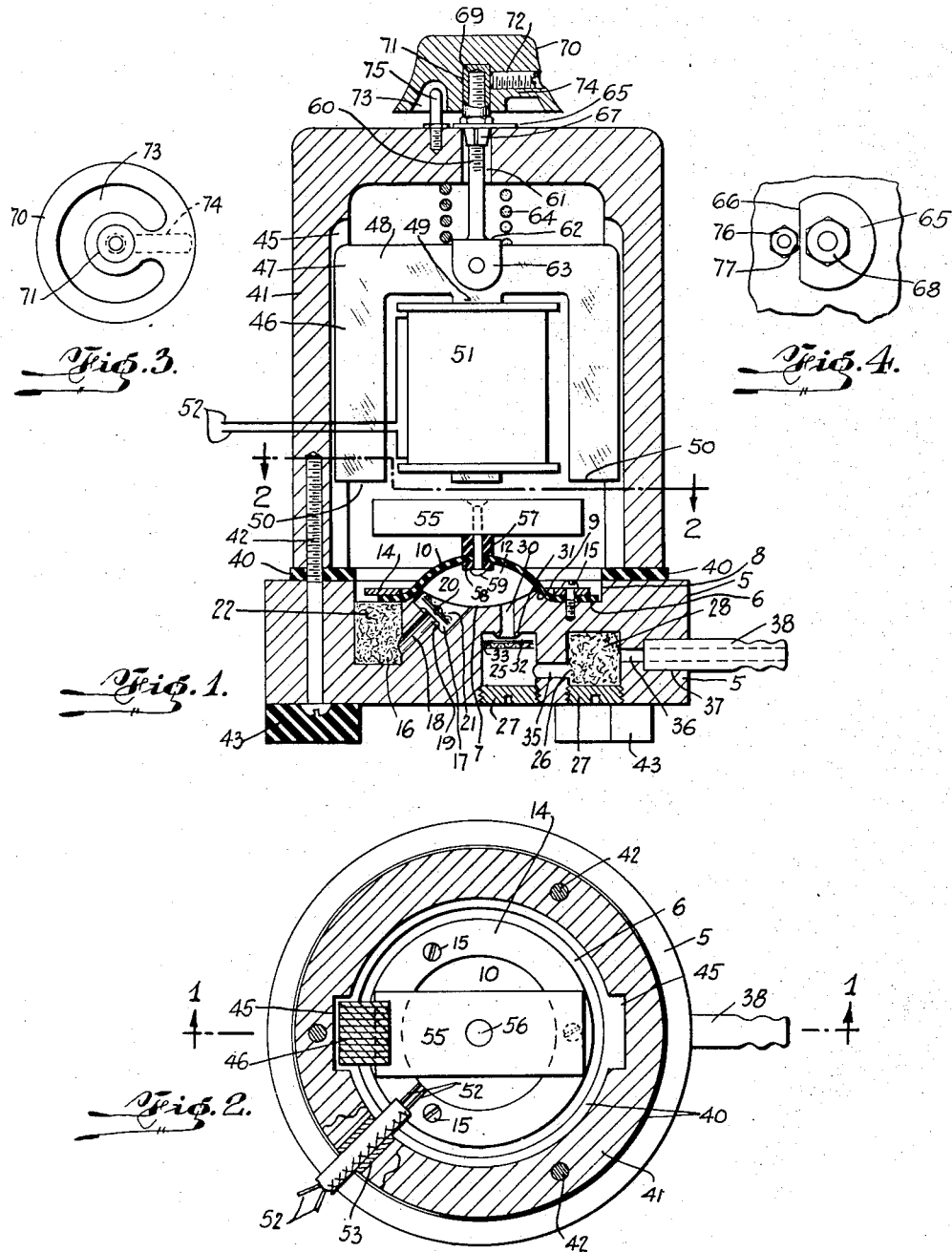

2,471,796

UNITED STATES PATENT OFFICE 2,471,796

AIR PUMP FOR AQUARIUM AERATORS

George A. Thiberg, Cedar Knolls, N. J.

Application October 1, 1945, Serial No. 619,566

9 Claims. (Cl. 230—170)

This invention relates to pumps and more particularly to air pumps for aquarium aerators, known usually as aquarium pumps or aquarium aerators. The object of an aquarium pump is to supply a stream of air under pressure sufficient to supply with air one or several porous aerator stones, disposed in the water of the aquarium, with air. The air, by passing through the minute holes in the stone, is broken up into minute bubbles which aerate the water. An aerator stone is shown in my Patent No. 2,186,564, issued January 9, 1940. The pump is also used in combination with a filter to clean the water of impurities, such as decayed food, dust and the like.

One object of the invention is to provide an improved device of this kind which is compact and rugged in design, noiseless in operation, and easily adjusted and controlled.

Other objects of the invention are to provide an improved device of this kind which will filter the air and which is not rendered inefficient by dust or the like in the air.

Additional objects of the invention are to effect simplicity and efficiency in such apparatus and to provide an extremely simple device of this kind which is economical, durable, and reliable in operation, economical to manufacture and requires no special installation.

Still other objects of the invention will appear as the description proceeds; and while herein details of the invention are described in the specification and some of the claims, the invention, as described in some of the broader claims, is not limited to these, and many and various changes may be made without departing from the scope of the invention, as claimed in the broader claims.

The inventive features for the accomplishment of these and other objects are shown herein in connection with an aquarium pump later described in detail and which briefly stated, includes a base carrying an upwardly domed resilient diaphragm, secured at its margin on and cooperating with the base to form a pump chamber; the top face of the base being provided, exterior to said chamber, with a filter well, and in the pump chamber with an inlet valve recess provided with a central valve aperture communicating with the lower part of the well. Said base also has therein a discharge valve chamber, a filter chamber communicating with an exterior hose receiving nozzle and the valve chamber, and a valve aperture from the valve chamber to the pump chamber. Ribs are provided around said valve apertures in the valve chamber and valve recess, with which ribs said fly valves are respectively engageable, the ribs serve to avoid the collection of dust under the valves. Filter material in the well and filter chamber and a pervious ring on said base around said diaphragm and well on which a housing is clamped, act as silencers and filter the air as it passes through the pump.

An electromagnet vertically adjustable in the housing and having lower pole faces disposed over an armature secured on said diaphragm vibrates the armature and diaphragm when suitable alternating, pulsating, or high frequency current is passed through the coil of the electromagnet.

In the accompanying drawing showing, by way of example, one of many possible embodiments of the invention:

Figure 1 is a vertical sectional view, partly in elevation, showing the interior of the housing, the section being taken substantially on the line I—I of Figure 2, looking in the direction of the arrow of said line, Figure 2 is a transverse horizontal sectional view, partly in elevation, showing principally the diaphragm, armature, and housing base, the section being taken substantially on the line 2—2 of Figure 1, looking in the direction of the arrows of said line, Figure 3 is a bottom plan of a knob operating the adjusting means for adjusting the magnet, and Figure 4 is a fragmental detail plan view.

My improved aquarium aerator pump includes a circular base 5 of plastic or other suitable material, provided within the margin of the top face with a large circular recess 7 comprising a wide annular groove 6 forming the outer part of the circular recess and having a substantially vertical outer face 8, a substantially flat bottom and an upwardly inclined inner face 9, the inner part of the circular recess being formed with a concaved face forming the inner recess or depression 7 joining said inclined face to form an annular ridge.

An inherently flat, but upwardly curved or domed diaphragm 10 of rubber or other suitable material has a concaved lower face and having its margin resting on said inclined face 9 and part of said flat bottom, said diaphragm forms a movable wall cooperating with said inner recess 6 to form a pump chamber 12, and is held in place by a flat clamping ring 14 of metal or other suitable material disposed on the margin of said diaphragm and having a bevel at the inner edge of its lower face conforming to the shape of said inclined face 9. The ring 14 is held in place by clamping screws 15 passing through the ring and having threaded engagement in the base 5 to clamp the ring on the diaphragm and the diaphragm on said inclined face 9, so as to incline the margin of the diaphragm inwardly and upwardly to give the diaphragm an upwardly domed shape to cooperate with the inner recess 7 to form the pump chamber 12.

Said base 5 is also provided in the flat bottom of said groove with a filter well 16, and in the adjacent margin of the inner recess with a circular valve recess 17 provided with a central aperture 18 surrounded by an annular rib 19 and communicating with the lower part of the well 16. A rubberized cloth inlet fly valve 20 in the valve recess normally rests on said rib 19 and opens toward the pump chamber, and a woven wire screen 21 fitted with a forced fit in and across the mouth of the valve recess serves for loosely holding the fly valve in the valve recess adjacent to the annular rib 19. Sound and dust filtering silencing filter felt 22, substantially fills the well 16.

Said base 5 is also provided in its bottom face with an upwardly extending valve chamber 25 and filter chamber 26, both threaded at the lower end and closed by threaded plugs 27, fitted in said ends respectively. Silencing filter felt 28 substantially fills the filter chamber 26. An aperture 30, provided from the center of the valve chamber to the pump chamber has a rib 31 around said aperture, against which may engage a rubberized cloth outlet fly valve 32, held adjacent to the rib by a woven wire screen 33 fitted with a forced fit across the valve chamber. The base is provided with an aperture 35, establishing communication between said valve and filter chambers, and with an aperture 36 from the filter chamber through the side face of the base and having a counterbore 37 at the outer end, in which is fitted a hose-receiving bushing 38 adapted to receive thereon a hose to the porous aerator stones.

A pervious flat silencing ring 40 of felt, sponge rubber or the like, secured on the top face of said base exterior to and around said groove 6 and filter well 22 has clamped thereon an inverted cup-shaped cylindrical housing 41 clamped on the silencing ring by screws 42, passing upwardly through said base and into the material of the side wall of the cup, for holding the housing in place. The heads of the screws are hid by sponge rubber cushioning, silencing and supporting blocks 43, secured to the bottom face of the base.

Said housing is provided in opposite parts of the inner face of the side wall with vertical guide ways 45, the rectangular cross section, in which are receiving the side legs 46 of a three-legged magnet 47 adjustably slidable in said guide ways and comprising an upper yoke 48, a large central leg 49, downwardly extended from the center of the yoke, and the downwardly extended side legs 46 slidably fitted in said ways 45, respectively; the legs being in the same vertical plane and having lower end-pole faces 50 in the same horizontal plane. An electromagnetic coil 51 around said central leg is connected by insulated wires 52 (Figure 2) passing out through an opening 53 in the housing to a suitable source of alternating or pulsating current.

An armature 55 secured on the top part of the diaphragm and spaced beneath said pole faces is held in place by a rivet 56, passing through said armature, diaphragm 10 and gum rubber washers 57, 58 on the rivet compressed between the diaphragm and armature and the lower rivet head 59 and holding the armature firmly on the diaphragm, whereby pulsating or alternating magnetization of the electromagnet causes the diaphragm to vibrate.

An adjusting screw 60, passing through a central aperture 61 in the top of the housing, is threaded at its upper portion and has on its lower end a yoke 62 carrying downwardly projected spaced ears 63 riveted to the magnet yoke. A helical spring 64 on said screw is compressed between the housing top wall and magnet yoke. A washer 65 around said screw and having a straight side edge 66 (Figure 4) rests on the housing and receives the lower end portion 67 of an angular adjusting nut 68 on said screw, having an upper internally threaded tubular portion 69 received on said screw, the lower portion 67 being split and received in the washer and thereby tightly held on the screw. Rotation of the nut adjusts the magnet up and down over the armature.

A knurled knob or button 70 having a downwardly open central bore 71 received on said upper tubular portion 69 carries a radial set-screw 72, engaging the upper tubular portion 69 for holding the knob in adjusted position on the tubular portion. The lower face of the knob has a lower groove 73 almost, but not quite, around the knob, whereby a stop 74 (Figure 3) is formed at the ends of the groove on both sides of the set screw and leaving structure through which the set screw passes. A stop pin 75 fast in the top wall of the housing, and loose in said lower groove is positioned for engagement with said stop 74 to limit the rotation of the knob. Said stop pin has an angular flange 76 resting on the housing and having a straight edge 77 (Figure 3) cooperating with said straight edge 66 of the washer to prevent the latter from turning in the aperture 61.

The pulsating or alternating current intermittently magnetizes the magnet to vibrate the armature and diaphragm, and the knob 70 may be adjusted to raise or lower the magnet to such a position that the magnet will vibrate the armature and diaphragm $\frac{1}{16}''$ to $\frac{1}{8}''$, which has been found satisfactory. This vibration causes air to be drawn in through said silencing ring 40, the interior of the housing 41, the filter well 14, the silencing material 22 therein, the inlet valve aperture 18 and screen 20 into the pump chamber 12 and expelled through said outlet valve chamber 25, the filter chamber 26, the material 28 therein, said nozzle 38 and the hose to the aerator stones.

By turning the knob 70 clockwise, the magnet is raised against the action of the spring 64 and the pressure of the pump is reduced, by turning it in reverse direction, the pressure is increased. When properly adjusted, no rattle is present. If rattle is experienced, it may be eliminated by turning the knob clockwise.

It is obvious that changes may be made in the form, construction, and arrangement of several parts, as shown within the scope of the appended claims, without departing from the spirit of the invention, and I do not, therefore, wish to limit myself to the exact construction and arrangement shown and described herein.

What I claim as new and desire to secure by Letters Patent of the United States, is:

1. An aerator pump comprising a base provided on its top face with an inner recess and an annular upwardly and inwardly inclined face surrounding the recess and forming an upwardly pointed substantially frusto-conical face; an upwardly curved resilient diaphragm having its margin resting on said frusto-conical face, a clamping ring clamped on said margin and having a lower inner bevel conforming to the shape of said frusto-conical face and clamping said margin to incline the margin inwardly and upwardly to cause the diaphragm to assume a normal dome shape cooperating with the inner recess to form a pump chamber, a housing on said base around said frusto-conical face and communicating with the exterior, passages being provided from the pump chamber to the interior and exterior respectively of the housing, check valve means in the passages opening into and from the pump chamber, and means for vibrating the diaphragm, the resiliency of the diaphragm causing the diaphragm to rebound to normal dome shape.

2. An aerator pump comprising a circular base provided within the margin of the top face with an inner recess and an annular groove surrounding the recess and having a substantially flat bottom and an upwardly and inwardly inclined inner face forming an upwardly pointed substantially frusto-conical face; an inherently flat resilient rubber diaphragm having its mid-part upwardly curved away from the base, the margin of the diaphragm resting on said inclined frusto-conical face and part of said flat bottom, a clamping ring clamped in the annular groove adjustably pressed on the margin of the diaphragm and having a bevel at the inner edge of its lower face over, and conforming to the shape of, said frusto-conical face to clamp said margin and to incline the margin of the diaphragm inwardly and upwardly to provide a resilient upwardly domed diaphragm of a normal dome shape cooperating with the inner recess to form the pump chamber, a housing on said base over the diaphragm and communicating with the exterior, passages being provided from the pump chamber to the interior and exterior respectively of the housing, check valve means in the passages respectively opening into and from the pump chamber, and means for intermittently drawing the mid-part of the diaphragm upwardly and stretching the diaphragm from normal shape, the resiliency of the diaphragm cooperating with said means to cause the diaphragm to intermittently rebound to said normal dome shape.

3. An aerator pump comprising a base, an upwardly curved resilient rubber diaphragm having its margin secured on said base to provide a resilient upwardly domed diaphragm of a normal dome shape cooperating with the base to form the pump chamber, a housing on said base over the diaphragm and communicating with the exterior, passages being provided for conducting air from the housing to the chamber and from the chamber to the exterior of the housing, an armature secured horizontally on the top of the diaphragm and supported only by the diaphragm, an electromagnet vertically adjustable in said housing, and having lower pole faces disposed over the armature, means for intermittently energizing said magnet for intermittently attracting the armature for intermittently drawing the top of the diaphragm upwardly and stretching the diaphragm from said normal dome shape, the resiliency of the diaphragm cooperating to cause the diaphragm to intermittently rebound to said normal dome shape, and adjusting means operable from the exterior of the housing and secured to the magnet for vertically adjusting the magnet near to the armature but away from contact by the armature to prevent rattle.

4. In combination, a base, an upwardly domed resilient diaphragm on, and cooperating with the base to form a pump chamber, a pervious silencing ring of yieldable sound-deadening filtering material secured on the margin of the top face of said base around said diaphragm, an inverted cup-shaped housing secured with its lower edge supported and pressing on said silencing ring, said base being provided with passages from the pump chamber to the interior and exterior respectively of the housing, check valve means in the passages respectively opening into and from the pump chamber, said housing being provided in opposite parts of the inner face of the side wall with vertical guide ways of rectangular cross section, a three-legged magnet adjustably slidable in said guide ways and comprising an upper yoke, a large central leg downwardly extended from the center of the yoke and downwardly extended side legs slidably fitted in said ways respectively, the legs being in the same plane and having lower pole faces in the same horizontal plane, a magnet coil around the central leg adapted to receive alternating current, a horizontally elongated armature secured on the apex of the dome of the diaphragm, out of contact with other structure under and spaced from said lower faces, a screw secured to the magnet and passing through the top wall of the housing, and a nut on said screw and engaging the housing.

5. In combination, a base, an upwardly domed resilient diaphragm on and cooperating with the base to form a pump chamber, a flat pervious silencing and filtering ring of sponge rubber secured on the margin of the top face of said base around said diaphragm, an inverted cup-shaped cylindrical housing supported on the sliencing ring with its lower edge pressing on said ring, passages being provided from the pump chamber to the interior and exterior respectively of the housing having check valve means therein opening respectively into and from the pump chamber, and means in the housing for vibrating the diaphragm, whereby air may be drawn in through said silencing ring, the housing and the pump chamber and expelled to the exterior, the silencing ring serving the multiple function of supporting the housing, filtering the air and damping vibration tending to pass from the interior of the housing or from the base to the housing.

6. A pump comprising a base having an upstanding annular ridge, an elastic diaphragm over the ridge and having the outer marginal portions all projecting outside of the ridge and air tight against the base to form a pump chamber bounded by the base and diaphragm; a rigid ring drawn downwardly on said outer margins and surrounding the ridge, the lower face of the ring being below the uppermost parts of the ridge whereby the diaphragm is forced into a resilient dome form, and means secured to the central portion of the diaphragm for vibrating the diaphragm.

7. A pump comprising a base having an annular upstanding substantially rigid bead and a cavity within the confines of the bead and provided with valve inlet and outlet ducts in communication with the cavity, an elastic diaphragm of resilient material stretched across the bead to cover the cavity, and a retaining ring over the said marginal portions and around the bead and secured to the base, the lower face of the ring being below the topmost portion of the bead, the outer diameter of the ring differing in size from the outer diameter of the bead by an amount about equal to twice the thickness of the diaphragm.

8. A pump comprising a base having an upwardly open cavity therein and ducts communicating with the cavity, an upstanding substantially rigid annulus on the base and around the cavity, an elastic diaphragm disposed over the annulus, and a retaining ring around the annulus and diaphragm and secured down to the base and holding the marginal portions of the diaphragm gas-tight against the base and holding the diaphragm in radially stretched condition, the lowermost part of the ring being below the uppermost part of the annulus.

9. A pump comprising a base having an upwardly open cavity therein and ducts communicating with the cavity, an upstanding substantially rigid closed ridge on the base and around the cavity, an elastic diaphragm disposed over said ridge, and a retaining plate formed with a hole and arranged around said ridge and diaphragm and secured down to the base and holding the marginal portions of the diaphragm gas-tight against the base and holding the diaphragm in radially stretched condition, the lowermost part of the plate being below the uppermost part of said ridge.

GEORGE A. THIBERG.

REFERENCES CITED

The following references are of record in the file of this patent:

UNITED STATES PATENTS

| Number | Name | Date |
|---|---|---|
| 1,198,971 | Taylor | Sept. 19, 1916 |
| 1,767,320 | Sinanide | June 24, 1930 |
| 1,857,675 | Babitch | May 10, 1932 |
| 1,976,098 | Smith | Oct. 9, 1934 |
| 1,992,491 | Lindsay | Feb. 26, 1935 |
| 2,054,097 | Replogle | Sept. 15, 1936 |
| 2,060,063 | Frimand | Nov. 10, 1936 |
| 2,061,869 | Gilbert et al. | Nov. 24, 1936 |
| 2,063,728 | DeVille | Dec. 8, 1936 |
| 2,109,718 | Bayers | Mar. 1, 1938 |
| 2,186,564 | Thiberg | Jan. 9, 1940 |